(12) United States Patent
Hayashi et al.

(10) Patent No.: US 9,523,056 B2
(45) Date of Patent: Dec. 20, 2016

(54) BIOMASS SOLID FUEL

(71) Applicant: UBE INDUSTRIES, LTD., Ube-shi, Yamaguchi (JP)

(72) Inventors: Shigeya Hayashi, Ube (JP); Hiroshi Amano, Ube (JP); Nobuyuki Ooi, Ube (JP); Yuusuke Hiraiwa, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 0 days.

(21) Appl. No.: 14/649,892

(22) PCT Filed: Nov. 29, 2013

(86) PCT No.: PCT/JP2013/082291
§ 371 (c)(1),
(2) Date: Jun. 4, 2015

(87) PCT Pub. No.: WO2014/087949
PCT Pub. Date: Jun. 12, 2014

(65) Prior Publication Data
US 2015/0315505 A1  Nov. 5, 2015

(30) Foreign Application Priority Data

Dec. 5, 2012 (JP) .................. 2012-266635

(51) Int. Cl.
*C10L 5/04* (2006.01)
*C10L 5/28* (2006.01)
(Continued)

(52) U.S. Cl.
CPC ................ *C10L 5/44* (2013.01); *C10L 5/361* (2013.01); *C10L 5/363* (2013.01);
(Continued)

(58) Field of Classification Search
CPC ............. C10L 5/44; C10L 5/363; C10L 5/361; C10L 2200/0469; C10L 2290/32; Y02E 50/10; Y02E 50/30
See application file for complete search history.

(56) References Cited

U.S. PATENT DOCUMENTS 8,673,031 B2 * 3/2014 Dale ...................... A23K 1/146
                                                        44/589
8,961,628 B2 * 2/2015 Ampulski ................ C10J 3/485
                                                        48/61
(Continued)

FOREIGN PATENT DOCUMENTS

JP     2005239907 A    9/2005
JP     2006239729 A    9/2006
(Continued)

OTHER PUBLICATIONS

"Pelleting characteristics of selected biomass with and without steam exploding pretreatment" Phani Adapa, Lope Tabil, Greg Schoenau, Anthony Opoku Int. J Agric & Biol Eng vol. 3 No. 3 Sep. 2010 pp. 62-79.*

(Continued)

*Primary Examiner* — Pamela H Weiss
(74) *Attorney, Agent, or Firm* — Law Office of Katsuhiro Arai

(57) ABSTRACT

The present invention relates to a biomass solid fuel obtained by steam exploding and then molding biomass into biomass blocks and then heating the biomass blocks, wherein the biomass solid fuel has a fuel ratio of 0.2 to 2.5, a dry-based higher heating value of 5,000 to 7,500 (kcal/kg), a molar ratio of oxygen O to carbon C (O/C) of 0.1 to 0.6, and a molar ratio of hydrogen H to carbon C (H/C) of 0.5 to 1.35.

3 Claims, 3 Drawing Sheets

(51) Int. Cl.
*C10L 5/44* (2006.01)
*C10L 9/08* (2006.01)
*C10L 5/36* (2006.01)

(52) U.S. Cl.
CPC ... *C10L 2200/0469* (2013.01); *C10L 2290/32* (2013.01); *Y02E 50/10* (2013.01); *Y02E 50/30* (2013.01)

(56) References Cited

U.S. PATENT DOCUMENTS

| | | | | |
|---|---|---|---|---|
| 2002/0078623 | A1* | 6/2002 | Raddon | C10L 5/44 44/590 |
| 2009/0286295 | A1* | 11/2009 | Medoff | C07H 3/02 435/162 |
| 2010/0031560 | A1* | 2/2010 | Calabrese | C10J 3/482 44/550 |
| 2010/0112242 | A1* | 5/2010 | Medoff | C08H 8/00 428/22 |
| 2010/0124583 | A1* | 5/2010 | Medoff | A23K 1/007 426/2 |
| 2013/0256113 | A1* | 10/2013 | Tumiatti | C10B 1/10 201/19 |
| 2013/0341569 | A1* | 12/2013 | Ampulski | C10J 3/485 252/373 |

FOREIGN PATENT DOCUMENTS

| | | |
|---|---|---|
| JP | 2007283489 A | 11/2007 |
| JP | 2010037536 A | 2/2010 |
| JP | 2012011583 A | 1/2012 |
| WO | 2012023479 A1 | 2/2012 |

OTHER PUBLICATIONS

International Search Report (ISR) mailed Jan. 14, 2014, issued for International application No. PCT/JP2013/082291.

Kazuya Shimizu, "Mokushitsu Kei Shigen No Jousha/Bakusai Shori (Steam-Explosion Treatment of Wood)", pp. 22-38, Kamipa Gikyo Shi, vol. 42 (12), Dec. 1988.

Notification of Transmittal of Translation of the International Preliminary Report on Patentability (PCT/IB/338) mailed Jun. 18, 2015, with International Preliminary Report on Patentability (PCT/IB/373) and Written Opinion of the International Searching Authority (PCT/ISA/237), for corresponding international application PCT/JP2013/082291.

Raziyeh Khodayari, "Vattenfall strategy and experiences on co-firing of biomass and coal", Presentation at IEA Clean Coal Conference Mar. 27, 2012.

* cited by examiner

ABSTRACT

BIOMASS SOLID FUEL

This application is the U.S. National Phase under 35 U.S.C. §371 of International Application PCT/JP2013/082291, filed Nov. 29, 2013, which claims priority to Japanese Patent Application No. 2012-266635, filed Dec. 5, 2012. The International Application was published under PCT Article 21(2) in a language other than English.

TECHNICAL FIELD

The present invention relates to wood-based and herbaceous biomass solid fuels.

BACKGROUND ART

There has been disclosed a technique where a vegetative material is steam-exploded to volume-reduce and solidify the material into, for example, pellets (Patent Literature 1). There has also been disclosed a technique where a biomass solid produced by steam explosion is used as a fuel (Patent Literature 2). There has been further disclosed a technique where a lignin-containing biomass is steam-treated (steam-exploded), thereby facilitating molding (Patent Literature 3). In addition, Non-Patent Literature 1 has described that after steam exploding, hemicellulose in a biomass becomes water-soluble, and Non-Patent Literature 2 has described that when storing a biomass solid fuel after steam explosion, COD (Chemical Oxygen Demand) in discharged water becomes a problem.

CITATION LIST

Patent Literatures

Patent Literature 1: Japanese published unexamined application No. 2006-239729
Patent Literature 2: Japanese published unexamined application No. 2010-037536
Patent Literature 3: Japanese published unexamined application No. 2007-283489

Non-Patent Literatures

Non-Patent Literature 1: Kazuya Shimizu, "Mokushitsu Kei Shigen No Jousha/Bakusai Shori (steaming/exploding treatment of wood-based sources)", p. 1115 upper right column, Kamipa Gikyo Shi, Vol. 42 (12), December, 1988
Non-Patent Literature 2: Raziyeh Khodayari, "Vattenfall strategy and experiences on co-firing of biomass and coal", Presentation at IEA Clean Coal Conference 27 Mar. 2012

SUMMARY OF THE INVENTION

Problems to be Solved by the Invention

As described above, a biomass solid fuel has problems in handleability of the solid fuel, particularly problems such as COD increase in discharged water due to elution of organic ingredients (tar) by water such as rain water during storage, and powdering during transportation. However, Patent Literatures 1 and 2 have not described these problems or measures for solving them. Furthermore, Patent Literature 3 has not described a molded product as a fuel. When COD in discharged water is increased, a clean water system for discharged water must be additionally set up, leading to a cost increase. Non-patent Literatures 1 and 2 have described a problem that after explosion, organic ingredients in a biomass become more soluble in water, resulting in a COD increase in discharged water, but these documents have not described or suggested any means for solving this problem.

To solve these problems, an objective of the present invention is to reduce powdering and improve handleability during storage while reducing the COD in discharged water during storage.

Means for Solving the Problems

A biomass solid fuel of the present invention is a biomass solid fuel obtained by steam exploding and then molding biomass into biomass blocks and then heating the biomass blocks,
wherein the biomass solid fuel has a fuel ratio of 0.2 to 2.5, a dry-based higher heating value of 5,000 to 7,500 (kcal/kg), a molar ratio of oxygen O to carbon C (O/C) of 0.1 to 0.6, and a molar ratio of hydrogen H to carbon C (H/C) of 0.5 to 1.35.

The biomass blocks are preferably pellets or briquettes.

Effect of the Invention

According to the present invention, powdering can be reduced and handleability during storage can be improved while reducing COD in discharged water during storage.

DESCRIPTION OF EMBODIMENTS

Figure 1:
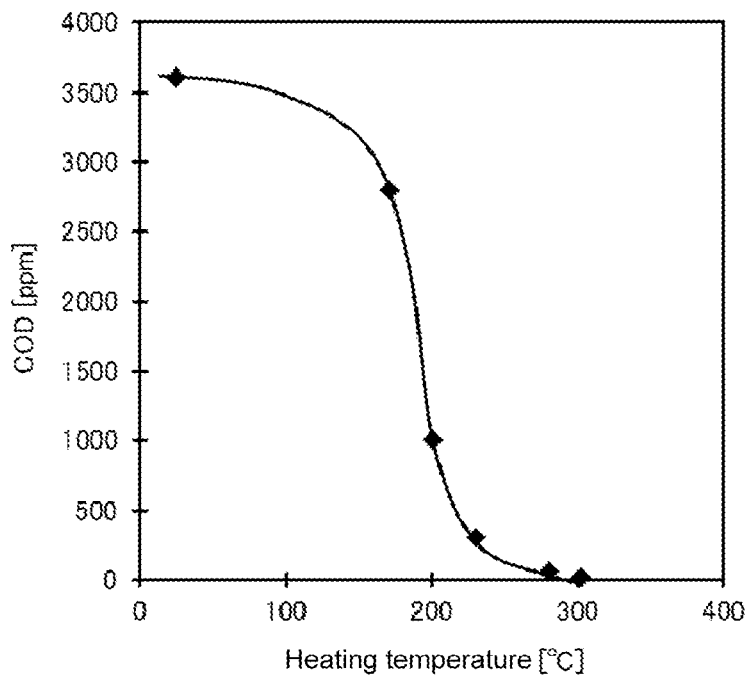
FIG. 1 shows a heating temperature-COD relationship of a biomass solid fuel.

A biomass solid fuel of the present invention is produced by an exploding step where a starting biomass is dried and steam-exploded; a molding step where the biomass obtained by the exploding step is molded into biomass blocks (preferably, pellets or briquettes); a heating step where the biomass blocks obtained by the molding step are heated. There are no particular limitations to the starting biomass so long as it is wood-based or herbaceous.

In the exploding step, a wood-based and herbaceous biomass is processed by a known steam explosion technique. In this exploding step, for example, a biomass is dried to a water content of 30% or less, and then steam at 150 to 250° C. is introduced and kept under an increased pressure of 14 to 60 kgf/cm$^2$ for about 1 to 20 min. Then, a pressure is rapidly released to modify the biomass. It is supposed that this modification by steam exploding fibrillates the wood-based and herbaceous biomass, resulting in elution of lignin so that the biomass acquires suitable properties for molding. In the molding step, the biomass is processed by a known molding technique to provide biomass blocks. Biomass blocks are preferably pellets or briquettes which can have any size.

In the heating step, the molded biomass blocks are heated. The heating temperature of the heating step is appropriately determined, depending on the shape and the size of the starting biomass and biomass blocks; it is preferably 150 to 400° C., more preferably 170 to 300° C., further preferably 200 to 260° C. The heating time of the heating step is preferably, but not limited to, 0.2 to 2 hours.

In a biomass solid fuel obtained after the heating step, the COD (Chemical Oxygen Demand) of an immersion water used for water immersion is preferably 3,000 ppm or less, more preferably 300 ppm or less, further preferably 100 ppm or less. Here, the COD (Chemical Oxygen Demand) of an immersion water used for water immersion of a biomass solid fuel means a COD value assayed in accordance with JIS K0102(2010)-17 for a sample of immersion water for COD determination prepared in accordance with Japan Environment Agency Announcement "(A) a method for detecting a metal or the like contained in an industrial waste", 1973.

A biomass solid fuel obtained after the heating step has a grindability index (HGI) in accordance with JIS M 8801 of preferably 20 or more and 60 or less.

A biomass solid fuel of the present invention has a fuel ratio of 0.2 to 2.5, a dry-based higher heating value of 5,000 to 7,500 (kcal/kg), a molar ratio of oxygen O to carbon C (O/C) of 0.1 to 0.6, and a molar ratio of hydrogen H to carbon C (H/C) of 0.5 to 1.35. With the physical properties of a biomass solid fuel within the above ranges, COD of a discharged water during storage can be reduced, powdering can be reduced and handleability during storage can be improved.

EXAMPLES

Examples 1 to 7

A biomass solid fuel was produced by the exploding and the molding steps followed by the heating step. In the heating step of each Example, a φ 600 mm batch type electric furnace was charged with 4 kg of raw material, which was heated at a temperature increase rate of 2° C./min to a target temperature of each Example (heating temperature in Table 1). The heating time in Table 1 indicates a time from the initiation of temperature increase to a target temperature. Hereinafter, a target temperature is synonymous with a heating temperature. Heating temperatures during the heating step of Examples 1 to 3 and 5 to 7 and the properties of a biomass solid fuel obtained after the heating step are shown in Table 1.

Comparative Examples 1 to 3

Comparative Examples 1 to 3 are raw biomasses obtained without the exploding or the heating step. PKS in Comparative Example 3 is a palm kernel shell (remaining shell after pressing kernel oil from seeds of palm trees). The properties of raw biomasses of Comparative Examples 1 to 3 are shown in Table 1.

Comparative Example 4

Comparative Example 4 is a biomass solid fuel immediately after the exploding and the molding steps and before heating. The properties of the biomass solid fuel of Comparative Example 4 before heating are shown in Table 1.

In Table 1, the grindability index (HGI) is based on JIS M 8801, and the larger it is, the better grindability is. Table 1 shows a higher heating value, a fuel ratio calculated based on an industrial analysis value (air dried basis), and the elemental analysis results and each molar ratio of oxygen O, carbon C and hydrogen H. Here, industrial analysis values, elemental analysis values and calorific values in Table 1 are based on JIS M 8812, 8813 and 8814.

TABLE 1

| Solid fuel | | | Comp. Ex. 1 Charcoal | Comp. Ex. 2 Mallee | Comp. Ex. 3 PKS | Comp. Ex. 4 | Ex. 1 | Ex. 2 |
|---|---|---|---|---|---|---|---|---|
| Heating temperature in the heating step (° C.) | | | | Nonheated | | Nonheated | 170 | 200 |
| Heating time in the heating step (min.) | | | | 0 | | 0 | 30 | 36 |
| Industrial analysis | Moisture | wt %-air dried | 5.2 | 9.1 | 10.9 | 7.8 | 6.7 | 6 |
| | Ash | wt %-air dried | 13.3 | 0.5 | 1.8 | 0.5 | 0.5 | 0.4 |
| | Volatiles | wt %-air dried | 17.2 | 79.3 | 70.4 | 76.6 | 76.2 | 75.7 |
| | Fixed carbon | wt %-air dried | 64.3 | 11.1 | 16.9 | 15.1 | 16.6 | 17.9 |
| | Fuel ratio | | 3.74 | 0.14 | 0.24 | 0.20 | 0.22 | 0.24 |
| | Higher heating value | kcal/kg (dry basis) | 6,562 | 4,581 | 5,022 | 5,029 | 5,106 | 5,174 |
| Grindability index | HGI | JIS M 8801 | | 16 | 14 | 20 | 51 | 49 |
| Elementary analysis | Ash | wt %-dry | 14 | .5 | 2.1 | 0.5 | 0.5 | 0.4 |
| | Carbon | wt %-dry | 74 | 49.1 | 52.7 | 52.2 | 54 | 53.8 |
| | Hydrogen | wt %-dry | 2.3 | 5.3 | 5.1 | 5.7 | 5.8 | 6.8 |
| | Oxygen | wt %-dry | 10.1 | 45 | 39.7 | 41.4 | 40.5 | 39.8 |
| | Nitrogen | wt %-dry | 0.5 | 0.1 | 0.4 | 0.2 | 0.1 | 0.2 |
| | Combustible sulfur | wt %-dry | 0.02 | 0.01 | 0.02 | 0 | 0 | 0 |
| | Total sulfur | wt %-dry | 0.07 | 0.02 | 0.03 | 0.01 | 0.01 | 0.01 |
| | Incombustible sulfur | wt %-dry | 0.5 | 0.01 | 0.01 | 0.01 | 0.01 | 0.01 |
| | O/C | mol/mol | 0.10 | 0.69 | 0.56 | 0.59 | 0.57 | 0.55 |
| | H/C | | 0.38 | 1.30 | 1.16 | 1.31 | 1.31 | 1.29 |
| | H/O | | 3.64 | 1.88 | 2.06 | 2.20 | 2.29 | 2.33 |

TABLE 1-continued

| Solid fuel | | | Ex. 3 | Ex. 5 | Ex. 6 | Ex. 7 |
|---|---|---|---|---|---|---|
| Heating temperature in the heating step (° C.) | | | 230 | 260 | 280 | 300 |
| Heating time in the heating step (min.) | | | 42 | 48 | 52 | 56 |
| Industrial analysis | Moisture | wt %-air dried | 5.7 | 6.0 | 5.6 | 5.4 |
| | Ash | wt %-air dried | 0.5 | 0.5 | 0.5 | 0.6 |
| | Volatiles | wt %-air dried | 74.5 | 72.3 | 70 | 60.4 |
| | Fixed carbon | wt %-air dried | 19.3 | 21.2 | 23.9 | 33.6 |
| | Fuel ratio | | 0.26 | 0.29 | 0.34 | 0.56 |
| | Higher heating value | kcal/kg (dry basis) | 5,279 | 5,382 | 5,560 | 6,104 |
| Grindability index | HGI | JIS M 8801 | 53 | 33 | 47 | 39 |
| Elementary analysis | Ash | wt %-dry | 0.5 | 0.5 | 0.5 | 0.6 |
| | Carbon | wt %-dry | 54.8 | 56.3 | 57.8 | 65 |
| | Hydrogen | wt %-dry | 6.7 | 5.5 | 5.6 | 5.3 |
| | Oxygen | wt %-dry | 38.9 | 37.5 | 36.0 | 30.8 |
| | Nitrogen | wt %-dry | 0.1 | 0.2 | 0.1 | 0.1 |
| | Combustible sulfur | wt %-dry | 0 | 0 | 0 | 0 |
| | Total sulfur | wt %-dry | 0.01 | 0.01 | 0.01 | 0.01 |
| | Incombustible sulfur | wt %-dry | 0.01 | 0.01 | 0.01 | 0.01 |
| | O/C | mol/mol | 0.53 | 0.50 | 0.47 | 0.37 |
| | H/C | | 1.25 | 1.17 | 1.16 | 1.01 |
| | H/O | | 2.34 | 2.35 | 2.49 | 2.75 |

The biomass solid fuels obtained in Examples and Comparative Examples were further analyzed as follows.

COD Reduction

FIG. 1 shows a relationship between heating temperature in the heating step and COD (Chemical Oxygen Demand) of immersion water used for water immersion of the biomass solid fuel obtained. A sample of immersion water for COD determination was prepared in accordance with Japan Environment Agency Announcement "(A) a method for detecting a metal or the like contained in an industrial waste", 1973, and the COD was analyzed in accordance with JIS K0102 (2010)-17.

Although not shown in FIG. 1, CODs in Comparative Examples 2 and 3 are 270 ppm and 29 ppm, respectively. From FIG. 1, the COD of Comparative Example 4 (a biomass solid fuel without being heated after explosion) was as high as 3,500 ppm or more. In contrast, it was indicated that a biomass solid fuel heated at 170° C. or higher had the COD of 3,000 ppm or less, and less tar was eluted. Thus, biomass solid fuels in Examples 1 to 7 were indicated to be excellent in handleability with less tar elution even when stored outdoors. In particular, in Example 3 and subsequent examples where the heating temperature was 230° C. or higher, the COD was comparable to that of a raw biomass without being exploded or heated (Comparable Examples 2 and 3), indicating that they do not significantly affect the environment during storage.

Grindability

Figure 2:
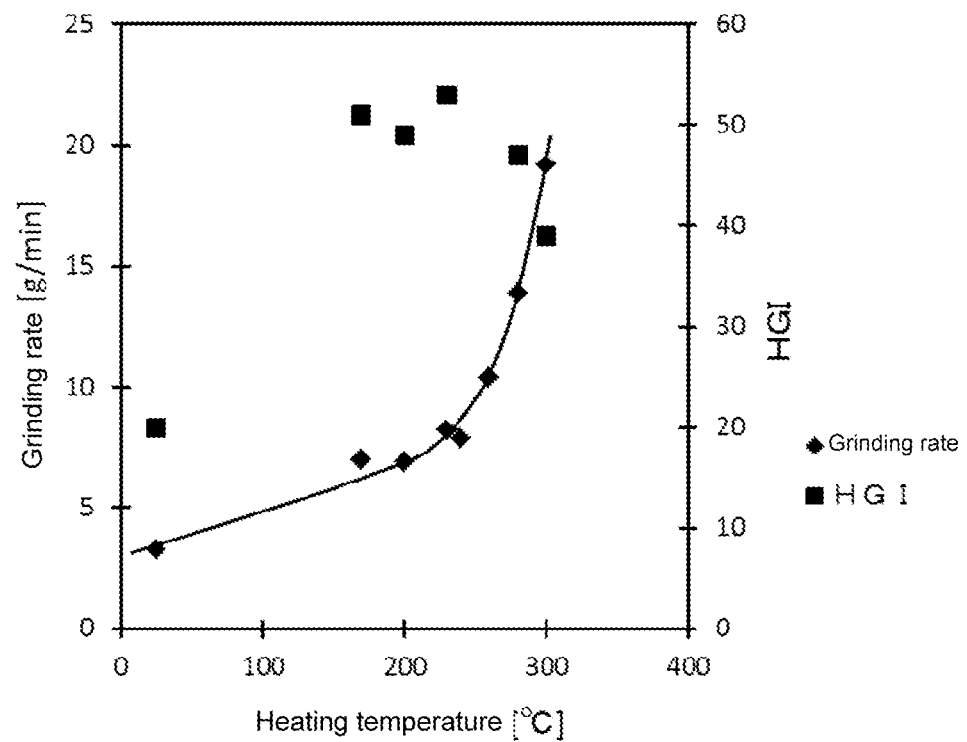
FIG. 2 shows a relationship between heating temperature in a heating process and grindability of a biomass solid fuel obtained, and a grinding rate.

FIG. 2 shows a relationship between heating temperature in the heating step and grindability (HGI) and grinding rate (described later) of the biomass solid fuel obtained, for the biomass solid fuels in Comparative Example 4 and Examples 1 to 7. In FIG. 2 and subsequent figures, an example where the heating temperature is 240° C. in the heating step is shown as Example 4.

As clearly seen from Table 1 and FIG. 2, properties in Examples 1 to 7 were altered by heating, and the HGI value (based on JIS M 8801) was higher than that of Comparative Examples 1 to 3 (raw biomass) or Comparative Example 4 (before heating). A typical HGI value for coal (bituminous coal) is around 50, and grinding properties of Examples 1 to 7 are good, that is, almost comparable to that of coal.

The grinding rate in FIG. 2 is a ground weight per a unit time (g/min) as determined by measuring the weight of a ground sample which is a fraction passing through a 150 μm sieve after grinding a sample with a 700 cc ball mill. Heating improves the grinding rate. In particular, heating at 230° C. or higher considerably increases the grinding rate. It can be considered that elution and solidification associated with heating of organic ingredients such as tar leads to an increase in hardness of the biomass solid fuel and improvement of grinding efficiency.

Water Immersion

Figure 3:
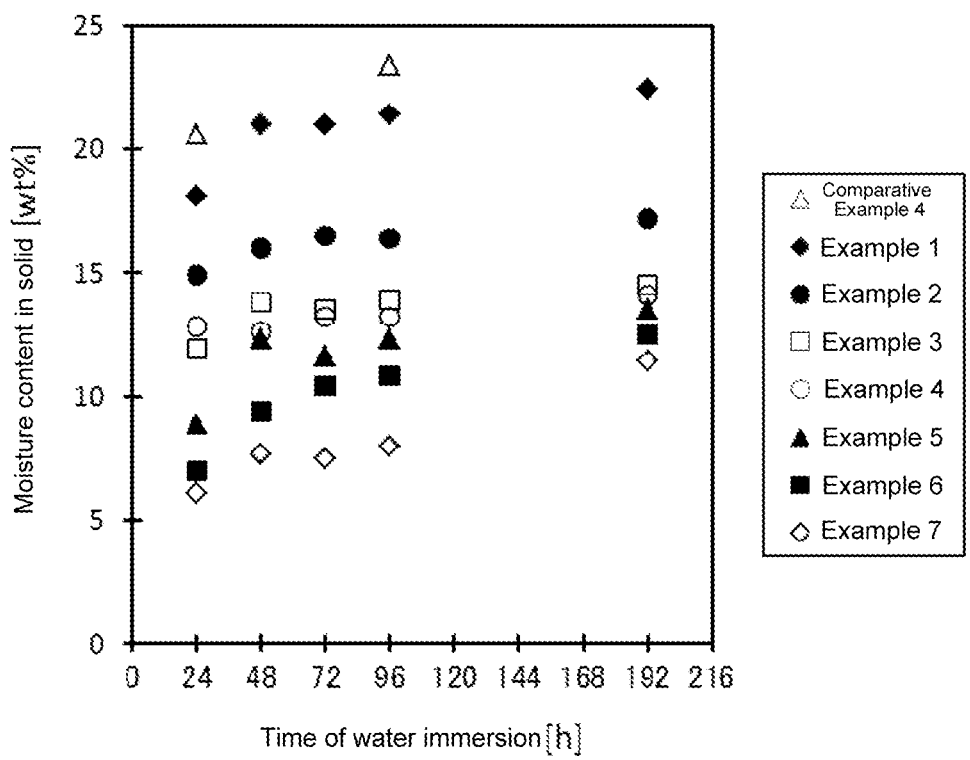
FIG. 3 shows the results of a water immersion test of biomass solid fuels.

FIG. 3 shows the results of a water immersion test of biomass solid fuels. A solid fuel from each of Examples and Comparative Examples was immersed in water and removed after a predetermined time. After wiping off water, a moisture content of the solid was measured. The biomass solid fuel of Example 3 had an equilibrium moisture content of around 15% and no further absorption of water was seen. Examples 4 to 7 do not appear to reach equilibrium even after elapsing 196 hours, but it can be supposed that they will reach equilibrium at an equilibrium moisture content of Example 3 of 15% or less. Comparative Example 4 (a biomass solid fuel before heating) reached equilibrium at a moisture content of 25 wt % after elapsing about 20 days (not shown). It can be considered that these results were obtained because elution and solidification of organic ingredients such as tar associated with heating made the surface of the biomass solid fuel hydrophobic, indicating advantageous properties as a solid fuel which is often stored outdoors.

Solid Strength

Table 2 shows the measurement results of solid strength (in accordance with JIS Z 8841, a rotational strength test). By heating, solid strength was not significantly reduced even after water immersion (water immersion time was 96 hours in Comparative Example 4, and 192 hours in the other Examples). Thus, it can be said that even compared with Comparative Example 4 (unheated biomass solid fuel), powdering is prevented to occur, so that the handleability can be maintained.

TABLE 2

|  | Before water immersion | After water immersion |
|---|---|---|
| Comparative Example 4 | 99.4 | 99.2 |
| Example 1 | 99.4 | 99.2 |
| Example 2 | 99.5 | 99.3 |
| Example 3 | 99.3 | 99.3 |
| Example 4 | 99.3 | 99.4 |
| Example 5 | 99.2 | 99.2 |
| Example 6 | 98.9 | 99.3 |
| Example 7 | 98.2 | 98.8 |

Yield

Figure 4:
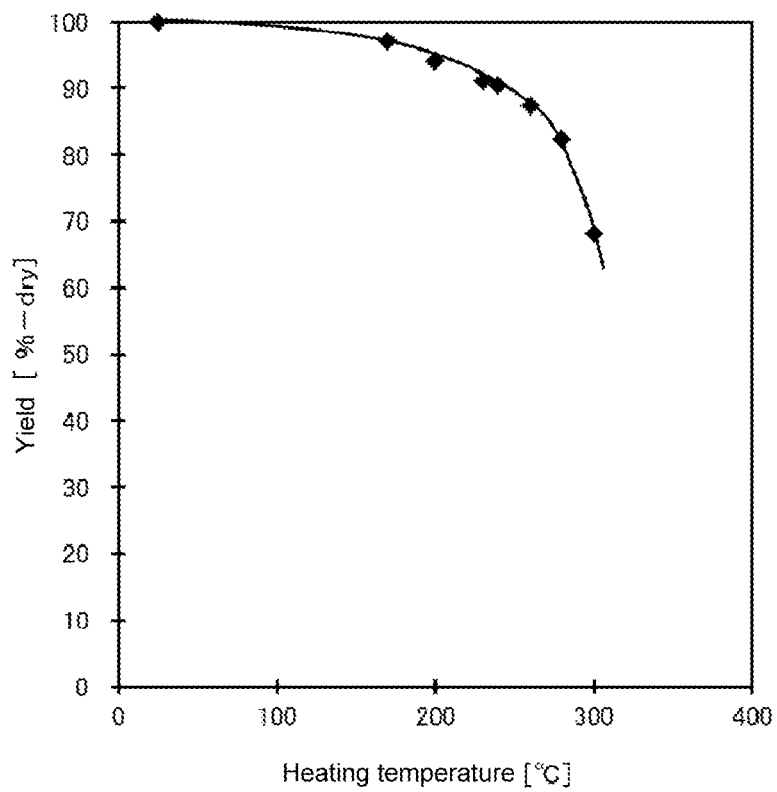
FIG. 4 shows an yield of a biomass solid fuel after a heating process.

FIG. 4 shows an yield of a biomass solid fuel after the heating step. Here, in each example, a target temperature (heating temperature) was not kept. With heating at 280° C. or higher, the slope of yield reduction is increased.

Thermogravimetric Analysis

Figure 5:
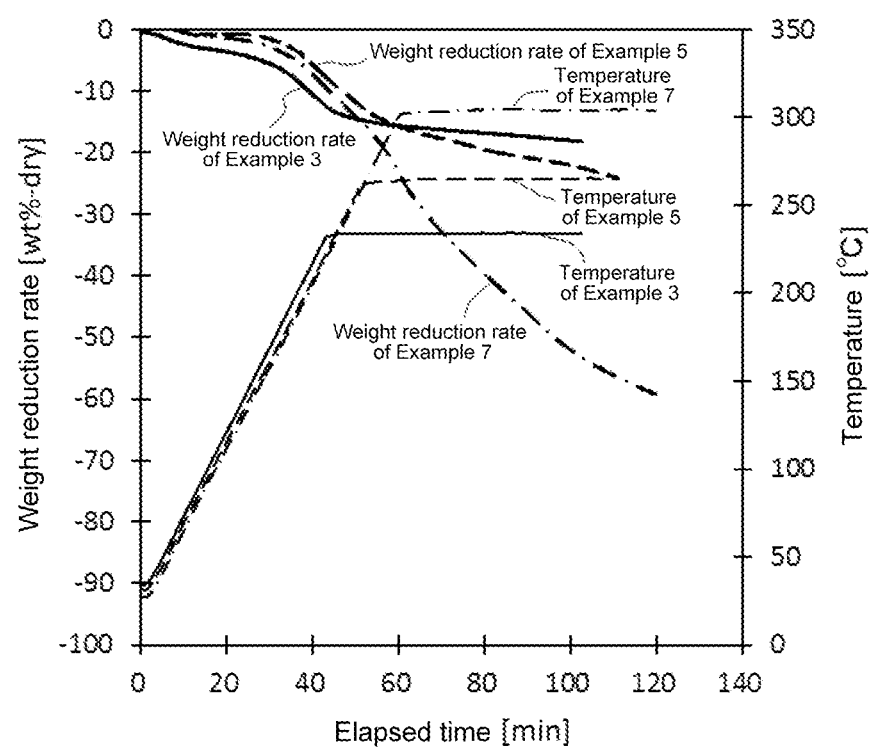
FIG. 5 shows the results of thermogravimetric analysis of biomass solid fuels.

FIG. 5 shows a thermogravimetric analysis of biomass solid fuels. Using a thermogravimetric analyzer (Rigaku Corporation, product number: TG8110), samples were heated to a temperature corresponding to that of each Example shown in FIG. 5 and kept at the temperature for 60 min. The figure shows that in Example 3 (230° C.), no significant weight loss due to temperature retention is observed and in Example 5 (260° C.), the weight is not significantly reduced although a little weight loss due to temperature retention is observed. In contrast, it can be seen that in Example 7 (300° C.), temperature retention leads to a significant weight loss.

The yield of Example 7 in FIG. 4 is about 68%, which is substantially equal to the weight of Example 7 at the retention time of 10 min (70 min after the initiation of heating) in FIG. 5. This is probably because the yield in FIG. 4 was determined for a solid fuel removed from a 600ϕ batch type electric furnace after cooling so that during cooling, thermal decomposition proceeded due to heat capacity of the electric batch furnace. Therefore, the biomass solid fuel of Example 7 can be identical to that kept at a temperature of 300° C. for 10 min.

In contrast, in Example 3 (230° C.) and Example 5 (260° C.), a weight reduction due to temperature retention is seen; however, since the reduction is gradual, it is assumed that the yield in FIG. 4 is substantially identical to the weight at the time zero of temperature retention in FIG. 5. Therefore, the biomass solid fuels of Examples 3 and 5 can be regarded as having a temperature retention time of substantially zero. As described above, it is shown that the effects such as reduction of COD, improvement in grindability and retention of solid strength are also observed in Examples 3 and 5, and these effects can be provided even with a temperature retention time of zero in order to reduce the production cost.

Although a batch furnace was used in these examples, a continuous furnace can be employed. In this invention, the use of a continuous furnace allows for reducing a residence time in the furnace because a temperature retention time when a batch furnace is used can be reduced.

The results of Examples 1 to 7 show that the present invention can provide a biomass solid fuel which can allow for COD reduction, improvement in grindability, reduction in water absorption and increase in yield, with a low cost.

The invention claimed is:

1. A biomass solid fuel obtained by steam exploding and then molding biomass into biomass blocks and then heating the biomass blocks at 150 to 400° C., wherein the biomass solid fuel has a fuel ratio of 0.2 to 2.5, computed by dividing the weight percent of fixed carbon by the weight percent of volatile matter, a dry-based higher heating value of 5,000 to 7,500 (kcal/kg), a molar ratio of oxygen O to carbon C (O/C) of 0.1 to 0.6, and a molar ratio of hydrogen H to carbon C (H/C) of 0.5 to 1.35, wherein the biomass solid fuel is wood-based and/or herbaceous, wherein the COD of an immersion water used for water immersion of the biomass solid fuel is 3,000 ppm or less, and, wherein the biomass solid fuel has a grindability index (HGI) of 20 or more and 60 or less.

2. The biomass solid fuel according to claim 1, wherein the biomass blocks are pellets or briquettes.

3. The biomass solid fuel according to claim 1, wherein the COD of an immersion water used for water immersion of the biomass solid fuel is 300 ppm or less.

* * * * *